(12) United States Patent
Kohara et al.

(10) Patent No.: US 11,995,740 B2
(45) Date of Patent: May 28, 2024

(54) IMAGE PROCESSING DEVICE AND IMAGE PROCESSING METHOD

(71) Applicant: SONY GROUP CORPORATION, Tokyo (JP)

(72) Inventors: Shunitsu Kohara, Tokyo (JP); Hidenori Aoki, Tokyo (JP); Hirotake Ichikawa, Tokyo (JP); Shintaro Tsutsui, Tokyo (JP); Hiroshi Matsuyama, Tokyo (JP); Hajime Wakabayashi, Tokyo (JP); Atsushi Ishihara, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 35 days.

(21) Appl. No.: 17/781,212

(22) PCT Filed: Oct. 28, 2020

(86) PCT No.: PCT/JP2020/040442
§ 371 (c)(1),
(2) Date: May 31, 2022

(87) PCT Pub. No.: WO2021/117366
PCT Pub. Date: Jun. 17, 2021

(65) Prior Publication Data
US 2022/0414945 A1    Dec. 29, 2022

(30) Foreign Application Priority Data
Dec. 10, 2019   (JP) .................................. 2019-222614

(51) Int. Cl.
*G06T 11/00* (2006.01)
*G06T 7/70* (2017.01)
(Continued)

(52) U.S. Cl.
CPC ................ *G06T 11/00* (2013.01); *G06T 7/70* (2017.01); *G06T 13/00* (2013.01); *G06T 19/006* (2013.01); *G06V 20/20* (2022.01)

(58) Field of Classification Search
None
See application file for complete search history.

(56) References Cited

U.S. PATENT DOCUMENTS

| 2014/0140579 A1 | 5/2014 | Takemoto |
| 2019/0043259 A1* | 2/2019 | Wang ...................... G06F 3/012 |
| 2019/0355121 A1* | 11/2019 | Nelson ...................... G06T 7/13 |

FOREIGN PATENT DOCUMENTS

| CN | 110998674 A | 4/2020 |
| JP | 2014-106543 A | 6/2014 |
| WO | 2019/031015 A1 | 2/2019 |

OTHER PUBLICATIONS

International Search Report and Written Opinion of PCT Application No. PCT/JP2020/040442, dated Dec. 22, 2020, 10 pages of ISRWO.

* cited by examiner

*Primary Examiner* — Robert J Craddock
(74) *Attorney, Agent, or Firm* — CHIP LAW GROUP

(57) ABSTRACT

A device and a method for performing AR image display control in which flicker in a boundary region between a virtual object and a real object is not noticeable are provided. A real object detection unit that executes processing of detecting a real object in a real world, and an augmented reality (AR) image display control unit that generates an AR image visually recognized in such a manner that a virtual object exists in a same space as a real object and outputs the AR image to a display unit are included, in which the AR image display control unit, in a case where a position of the real object detected by the real object detection unit is on a (Continued)

near side in a depth direction with respect to a position where the virtual object to be displayed on the display unit is arranged, an additional virtual object is output to the display unit on the near side in the depth direction with respect to the position of the real object in such a manner as to hide at least a partial region of a boundary region between the virtual object and the real object.

16 Claims, 9 Drawing Sheets

(51) Int. Cl.
      *G06T 13/00*       (2011.01)
      *G06T 19/00*       (2011.01)
      *G06V 20/20*       (2022.01)

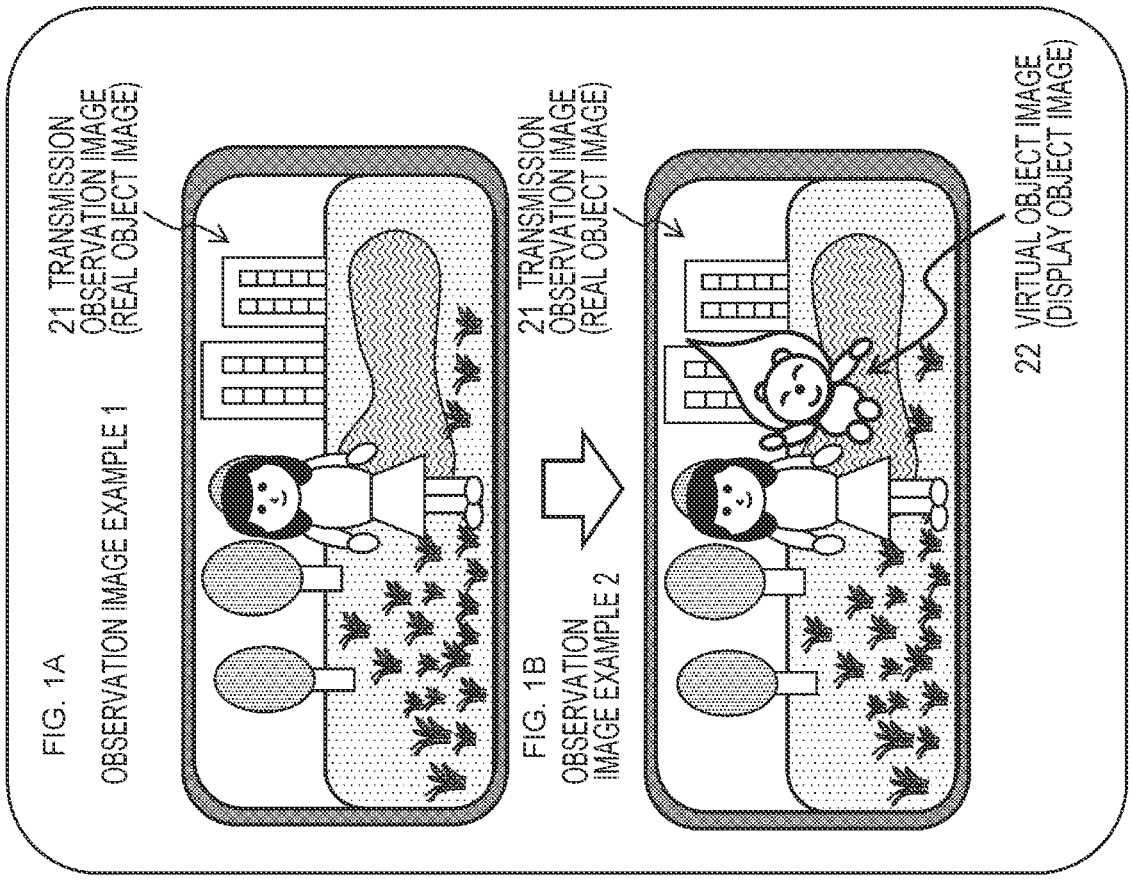
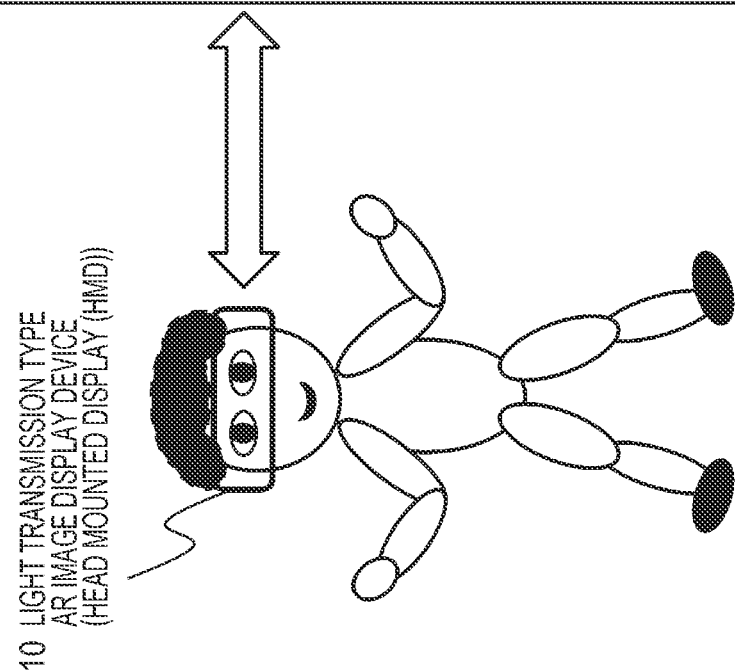

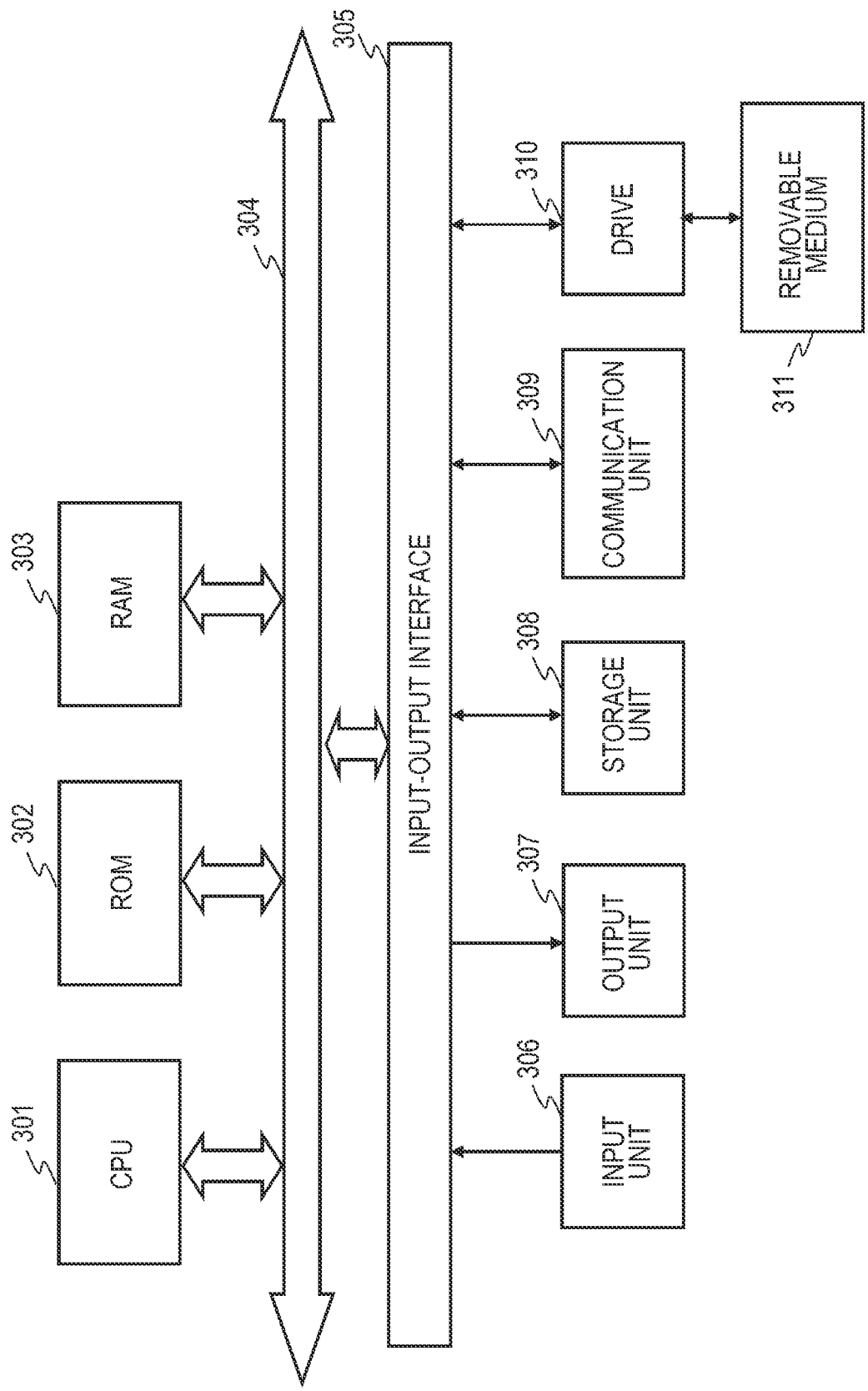

IMAGE PROCESSING DEVICE AND IMAGE PROCESSING METHOD

CROSS REFERENCE TO RELATED APPLICATIONS

This application is a U.S. National Phase of International Patent Application No. PCT/JP2020/040442 filed on Oct. 28, 2020, which claims priority benefit of Japanese Patent Application No. JP 2019-222614 filed in the Japan Patent Office on Dec. 10, 2019. Each of the above-referenced applications is hereby incorporated herein by reference in its entirety.

TECHNICAL FIELD

The present disclosure relates to an image processing device, an image processing method, and a program. More specifically, the present disclosure relates to an image processing device, an image processing method, and a program for generating and displaying an augmented reality (AR) image in which a virtual object such as a character image is visually recognized as being present in the same space as a real object that can be actually observed.

BACKGROUND ART

An image in which a virtual object such as a character image is visually recognized as being present in the same space as a real object that can be actually observed is called an augmented reality image or an augmented reality (AR) image.

The AR image is displayed using, for example, a head mount display (HMD) worn on the user's eyes, a mobile terminal such as a smartphone, or the like.

By observing the AR image, the user can enjoy feeling as if, for example, the display character in the AR image exists in the real world.

The AR image is an image in which the real object and the virtual object are mixed, and for example, in a case where a partial region of a virtual object overlaps a real object on a near side thereof, it is necessary to perform display control such that the virtual object in the overlapping region is not displayed.

Such display control is performed using, for example, a distance measurement result of a real object by a distance sensor (depth sensor) or the like. However, in a case where distance measurement accuracy of the distance sensor is insufficient, or in a case where the real object in front of the virtual object is a moving object, there is a problem that a boundary portion of an overlapping region between the real object and the virtual object becomes unclear, and a flicker, that is, a flicker due to repeated display and non-display of the virtual object occurs at this boundary portion.

Note that, for example, there is Patent Document 1 (WO 2019/031015) as a conventional technique that discloses a configuration for preventing such flicker.

Patent Document 1 discloses a configuration for displaying an effect such as blurring on a boundary region of a virtual object of a real object.

However, even if such image processing is performed, for example, in a case where the real object is a moving object, or the like, there is a problem that the processing cannot catch up because the boundary portion moves, and a sufficient flicker reduction effect cannot be obtained.

CITATION LIST

Patent Document

Patent Document 1: WO 2019/031015

SUMMARY OF THE INVENTION

Problems to be Solved by the Invention

The present disclosure has been made in view of the above problems, and provides an image processing device, and an image processing method, and a program that perform display control that makes it difficult for a user to recognize a flicker occurring in a boundary region between a real object and a virtual object.

Solutions to Problems

A first aspect of the present disclosure resides in an image processing device including:

a real object detection unit that executes processing of detecting a real object in a real world; and an augmented reality (AR) image display control unit that generates an AR image visually recognized in such a manner that a virtual object exists in a same space as a real object and outputs the AR image to a display unit, in which the AR image display control unit, in a case where a position of the real object detected by the real object detection unit is on a near side in a depth direction with respect to a position where the virtual object to be displayed on the display unit is arranged, outputs an additional virtual object to the display unit on the near side in the depth direction with respect to the position of the real object in such a manner as to hide at least a partial region of a boundary region between the virtual object and the real object.

Moreover, a second aspect of the present disclosure resides in an image processing method executed in an image processing device, the method including:

an actual object detecting step, by a real object detection unit, of executing processing of detecting a real object in a real world; and an augmented reality (AR) image display controlling step, by an AR image display control unit, of generating an AR image visually recognized in such a manner that a virtual object exists in a same space as a real object and outputting the AR image to a display unit, in which the AR image display controlling step includes, in a case where a position of the real object detected by the real object detection unit is on a near side in a depth direction with respect to a position where the virtual object to be displayed on the display unit is arranged, a step of outputting an additional virtual object to the display unit on the near side in the depth direction with respect to the position of the real object in such a manner as to hide at least a partial region of a boundary region between the virtual object and the real object.

Moreover, a third aspect of the present disclosure resides in a program for causing an image processing device to execute image processing, the program causing execution of:

an actual object detecting step, by a real object detection unit, of executing processing of detecting a real object in a real world; and an augmented reality (AR) image display controlling step, by an AR image display control unit, of generating an AR image visually recognized in such a manner that a virtual object exists in a same space as a real object and outputting the AR image to a display unit, in which the AR image display controlling step includes, in a case where a position of the real object detected by the real object detection unit is on a near side in a depth direction with respect to a position where the virtual object to be displayed on the display unit is arranged, executing outputting an additional virtual object to the display unit on the near side in the depth direction with respect to the position of the real object in such a manner as to hide at least a partial region of a boundary region between the virtual object and the real object.

Note that a program of the present disclosure is a program that can be provided by, for example, a storage medium or a communication medium provided in a computer-readable format to an information processing device or a computer system that can execute various program codes. By providing such a program in a computer-readable format, processing corresponding to the program is implemented on the information processing device or the computer system.

Other objects, features, and advantages of the present disclosure will become apparent from a more detailed description based on embodiments of the present disclosure described below and the accompanying drawings. Note that a system in the present description is a logical set configuration of a plurality of devices, and is not limited to one in which devices with respective configurations are in the same housing.

According to a configuration of an embodiment of the present disclosure, a device and a method for performing AR image display control in which flicker in a boundary region between a virtual object and a real object is not noticeable are achieved.

Specifically, for example, a real object detection unit that executes processing of detecting a real object in a real world, and an augmented reality (AR) image display control unit that generates an AR image visually recognized in such a manner that a virtual object exists in a same space as a real object and outputs the AR image to a display unit are included, in which the AR image display control unit, in a case where a position of the real object detected by the real object detection unit is on a near side in a depth direction with respect to a position where the virtual object to be displayed on the display unit is arranged, an additional virtual object is output to the display unit on the near side in the depth direction with respect to the position of the real object in such a manner as to hide at least a partial region of a boundary region between the virtual object and the real object.

With this configuration, a device and a method for performing AR image display control in which flicker in a boundary region between a virtual object and a real object is not noticeable are achieved.

Note that effects described in the present description are merely examples and are not limited, and additional effects may be provided.

BRIEF DESCRIPTION OF DRAWINGS

FIGS. 1A and 1B are diagrams describing a configuration example of an image processing device of the present disclosure and processing to be executed.

FIG. 9 is a diagram describing a hardware configuration example of the image processing device of the present disclosure.

MODE FOR CARRYING OUT THE INVENTION

Figure 2:
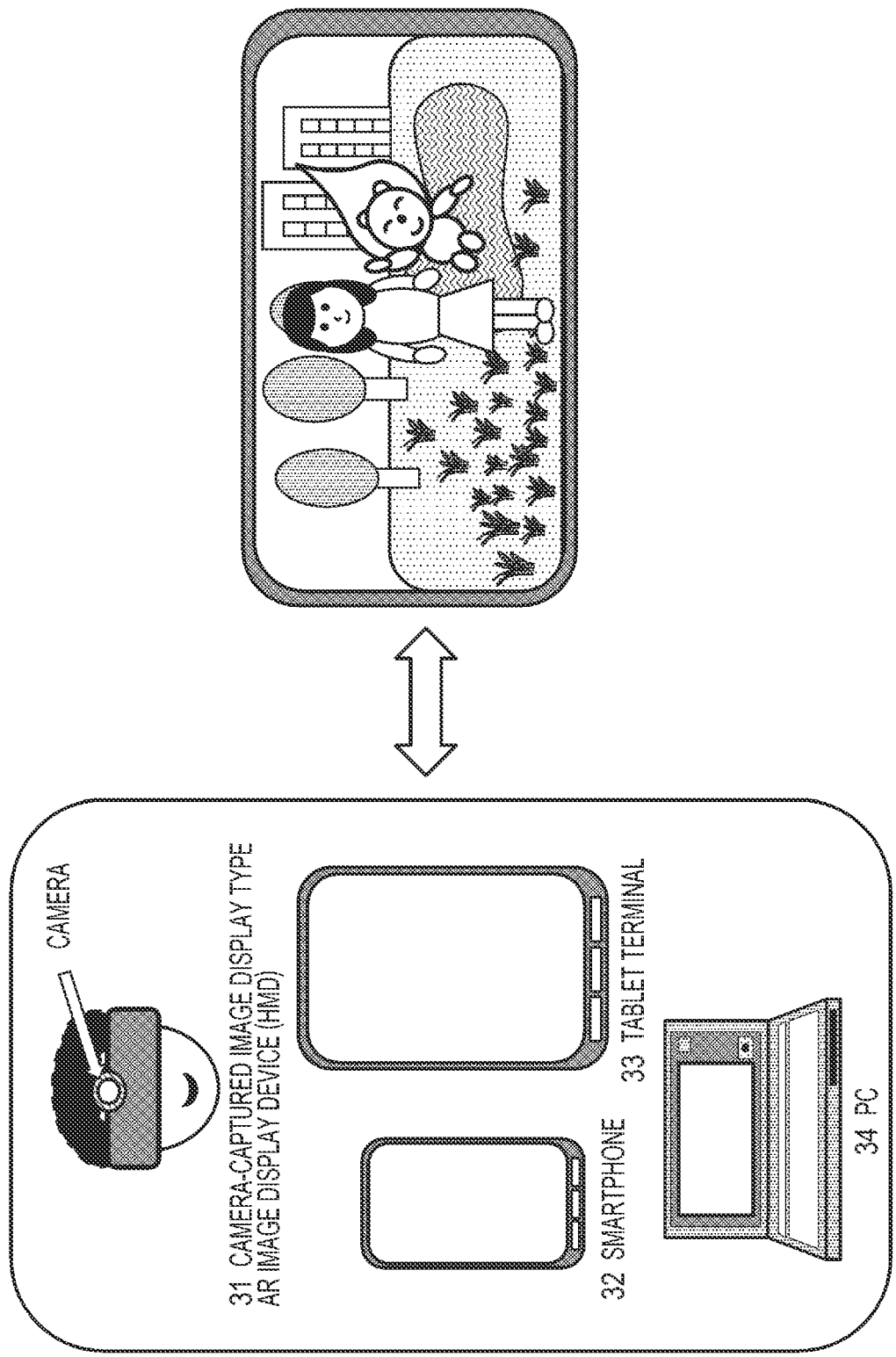
FIG. 2 is a diagram describing a configuration example of the image processing device of the present disclosure and processing to be executed.

Hereinafter, details of an image processing device, and an image processing method, and a program of the present disclosure will be described with reference to the drawings. Note that the description will be made according to the following items.

1. Outline of processing executed by image processing device of present disclosure
2. Problems in AR image display processing solved by image processing device of present disclosure
3. Outline of processing executed by image processing device of present disclosure
4. Configuration example of image processing device of present disclosure
5. Processing sequence executed by image processing device of present disclosure
6. Example of performing processing of limiting real object as output processing target of additional virtual object to moving real object
7. Processing sequence executed by image processing device that performs processing of limiting real object to be output processing target of additional virtual object to moving real object
8. Other configuration and processes of image processing device of present disclosure
9. Hardware configuration example of image processing device
10. Summary of configuration of present disclosure

[1. Outline of Processing Executed by Image Processing Device of Present Disclosure]

First, an outline of processing executed by the image processing device of the present disclosure will be described with reference to FIGS. 1A and 1B and subsequent drawings.

FIGS. 1A and 1B illustrate a light transmission type (see-through type) AR image display device 10 of a head mount display (HMD) type as an example of the image processing device of the present disclosure.

The user wears a head mount display (HMD) type light transmission type AR image display device 10 so as to cover the user's eyes.

The light transmission type AR image display device 10 includes a light transmission type (see-through type) display unit (display). The user wears a light transmission type display unit (display) so as to set the display unit at a position in front of the user's eyes.

The user can observe an external real object as it is via the light transmission type display unit (display) of the light transmission type AR image display device 10.

Moreover, a virtual object image of a virtual object, for example, a character image or the like is displayed on the light transmission type display unit (display).

The user can observe the external real object and the virtual object image of a character or the like together via the light transmission type AR image display device 10, and can feel a sense as if the virtual object of a character or the like exists in the real world.

The right side of FIGS. 1A and 1B illustrate an example of an image that can be observed by the user via the light transmission type AR image display device 10.

FIG. 1A Observation image example 1 includes a transmission observation image 21 including an external real object observed through the light transmission type AR image display device 10. In this image example 1, no virtual object is displayed.

On the other hand, FIG. 1B observation image example 2 is an image example in which a virtual object image 22 such as a character image is displayed together with a transmission observation image 21 including an external real object observed via the light transmission type AR image display device 10. The image example 2 is an image in which the user can observe a real object and a virtual object together.

As described above, an image in which a virtual object such as a character image is visually recognized as being present in the same space as a real object that can be actually observed is called an augmented reality image or an augmented reality (AR) image.

The image processing device of the present disclosure is a device that performs display processing of the AR image.

Note that the image processing device of the present disclosure is not limited to the light transmission type AR image display device 10 described with reference to FIGS. 1A and 1B, and can be configured by a device including various display units.

Specifically, for example, a camera-captured image display type AR image display device 31, a smartphone 32, a tablet terminal 33, a PC 34, and the like as illustrated in FIG. 2 can also be used as the image processing device of the present disclosure.

The camera-captured image display type AR image display device 31, the smartphone 32, the tablet terminal 33, and the PC 34 illustrated in FIG. 2 display a real image including a real object captured by the camera of each device on the display unit (display).

Note that, in the smartphone 32, the tablet terminal 33, and the PC 34, for example, a camera is mounted on a back side or a front side of each device, and this camera-captured image is displayed on the display unit.

Moreover, a virtual object image of a virtual object, for example, a character image or the like is displayed on the display unit (display) together with the real object.

The user can observe an AR image in which a real object image that is a camera-captured image and a virtual object image of a character or the like are mixed, and can feel a sense as if the virtual object of a character or the like exists in the real world.

Note that the "real object", the "virtual object", and the "AR image" generated by the information processing device of the present disclosure described in the present specification are defined as follows.

Real object=an object that is real

Virtual object=an object other than the real object, for example, a 2D image or a 3D model to be displayed (typically, 2D image data or 3D model data recorded in a database, for example)

AR image=an image obtained, in a case where display positions of the real object and the virtual object on the display unit overlap, by performing image processing so as not to display at least a part of an object (real object or virtual object) at a position with a long depth in the overlapping region. Note that, in a case where the display position of the real object or the virtual object is on a near side of the other object in the depth position, if the object is the real object, the object is visually recognized as it is, and if the object is the virtual object, the entire corresponding 3D model is displayed. Furthermore, the AR image may be an image subjected to any other image processing.

[2. Problem in AR Image Display Processing Solved by Image Processing Device of Present Disclosure]

Next, a problem in the AR image display processing solved by the image processing device of the present disclosure will be described.

Figure 3:
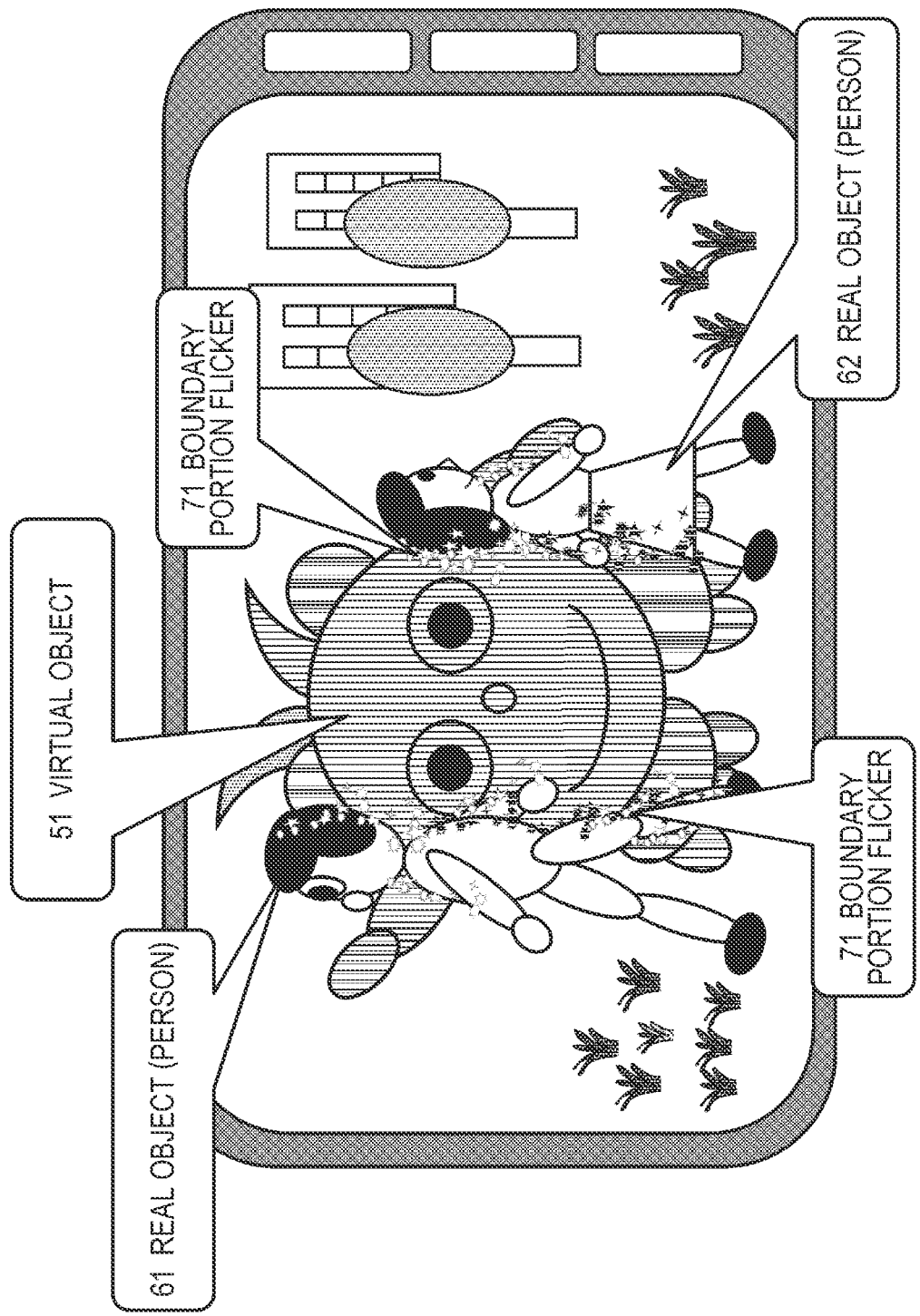
FIG. 3 is a diagram describing a flicker occurring in an AR image.

FIG. 3 is a diagram describing the problem in the AR image display processing.

The AR image is an image in which a real object and a virtual object are mixed.

For example, in a case where a partial region of the virtual object overlaps the real object on a near side thereof (AR image observation user side), it is necessary to perform display control such that the virtual object in the overlapping region is not displayed.

FIG. 3 is a diagram illustrating an AR image display example in a state in which real objects 61 and 62 that are people pass in front of a virtual object 51.

As illustrated in FIG. 3, in a case where a partial region of the virtual object 51 overlaps the real objects 61 and 62 on a near side thereof, the image processing device that executes the display control of the AR image performs display control such that the virtual object 51 in the overlapping region portion is not displayed.

This display control is performed using, for example, a distance measurement result of a real object by a distance sensor (depth sensor) or the like.

A data processing unit of the image processing device compares the depth position (distance from the camera) at which the virtual object 51 is displayed with the depth position (distance from the camera) of the real object, and in a case where the position of the real object (distance from the camera) is on a near side of the display position of the virtual object 51 (position close to the camera=AR image observation user side), the data processing unit performs display control such that the virtual object 51 in the region is not displayed.

However, in a case where distance measurement accuracy of the distance sensor is insufficient, or in a case where the real object in front of the virtual object is a moving object, a boundary portion of an overlapping region between the real object and the virtual object becomes unclear due to noise or the like of the distance sensor, and a flicker, that is, a flicker due to repeated display and non-display of the virtual object occurs at this boundary portion.

FIG. 3 illustrates an example of this flicker. A boundary portion flicker 71 illustrated in FIG. 3 is a flicker occurring at a boundary portion of the overlapping region between the real objects 61 and 62 and the virtual object 51.

In particular, as illustrated in FIG. 3, in a case where the real objects 61 and 62 are objects that move like a person, the boundary between the real object and the virtual object moves, and thus more severe flicker occurs.

The image processing device of the present disclosure performs control to display an image in which it is difficult for a user to recognize the flicker occurring in the boundary region between the real object and the virtual object.

[3. Outline of Processing Executed by Image Processing Device of Present Disclosure]

Next, an outline of processing executed by the image processing device of the present disclosure will be described.

Figure 4:
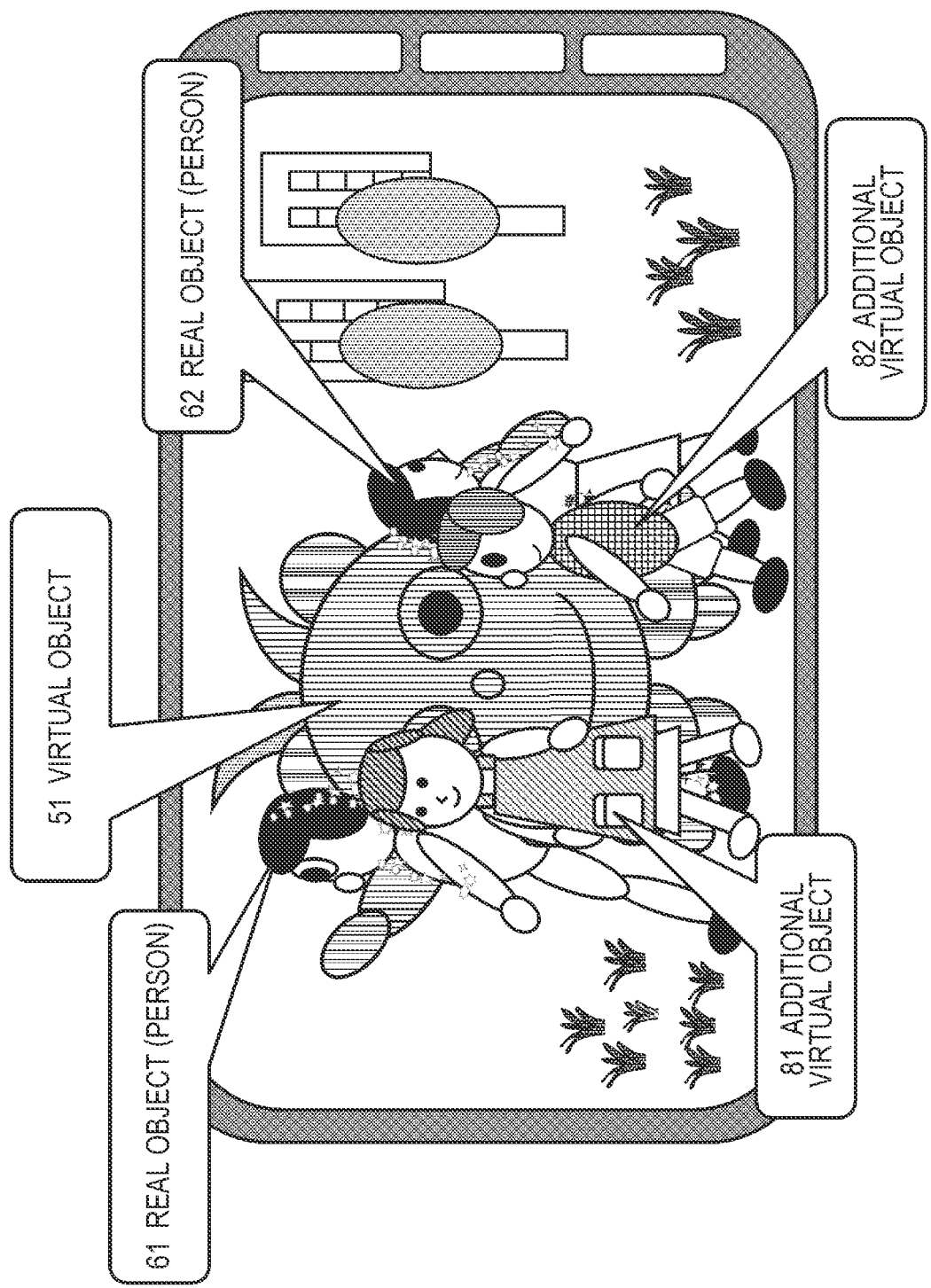
FIG. 4 is a diagram describing processing executed by the image processing device of the present disclosure.

FIG. 4 is a diagram describing an outline of processing executed by the image processing device of the present disclosure.

When performing display processing of an AR image including a real object and a virtual object, the image processing device of the present disclosure displays a new additional virtual object on the near side of the real object so as to hide at least a partial region of the boundary portion between the real object and the virtual object on the near side (camera side or AR image observation user side) of the virtual object.

The new additional virtual object is an additional virtual object 81, 82 illustrated in FIG. 4.

The additional virtual object 81, 82 illustrated in FIG. 4 is a virtual object displayed so as to hide at least a partial region of a boundary portion between a real object 61, 62 on the near side of the virtual object 51 and the virtual object 51.

The additional virtual object 81, 82 is displayed at a position on the near side of the real object 61, 62, that is, a position close to the camera side or the AR image observation user side.

By this display processing of the additional virtual object 81, 82, the flicker at the boundary portion between the real object 61, 62 and the virtual object 51 is covered, and the region that can be perceived as noise is reduced. That is, displaying the additional virtual object makes it difficult for the user (AR image observation user) to recognize the flicker.

Note that the type of the additional virtual object to be additionally displayed is selected by, for example, an AR image display application that performs display control of AR image content.

Specifically, for example, a virtual object of the same type as the real object displayed in the AR image is selected and displayed. In the example illustrated in FIG. 4, since the real objects 61 and 62 in the AR image are people, the additional virtual objects 81 and 82 to be additionally displayed are also virtual objects of people.

Note that the type of the additional virtual object to be additionally displayed is not limited to the same type as the displayed real object, and is only required to be an object of a non-unnatural type corresponding to the environment of the AR image being displayed.

For example, as illustrated in FIG. 4, in a case where the display environment of the AR image is "park" or "walk", a virtual object of a type such as a person, a dog, or a cat that is not unnatural even if it exists in "park" or "walk" is selected and displayed.

Note that, in a case where the real object is an object that moves like a person, the boundary region between the real object and the virtual object also moves. In such a case, the additional virtual object is also moved along with the movement of the boundary region. By performing such a process, it is possible to effectively hide the flicker portion of the moving boundary region.

Thus, when performing the display processing of the AR image including the real object and the virtual object, the image processing device of the present disclosure displays the new additional virtual object on the near side of the real object so as to hide at least a partial region of the boundary portion between the real object and the virtual object on the near side of the virtual object (AR image observation user side).

By this display processing of the additional virtual object, the flicker at the boundary portion between the real object and the virtual object is covered and is hardly recognized by the user (AR image observation user).

[4. Configuration Example of Image Processing Device of Present Disclosure]

Next, a configuration example of the image processing device of the present disclosure will be described.

Figure 5:
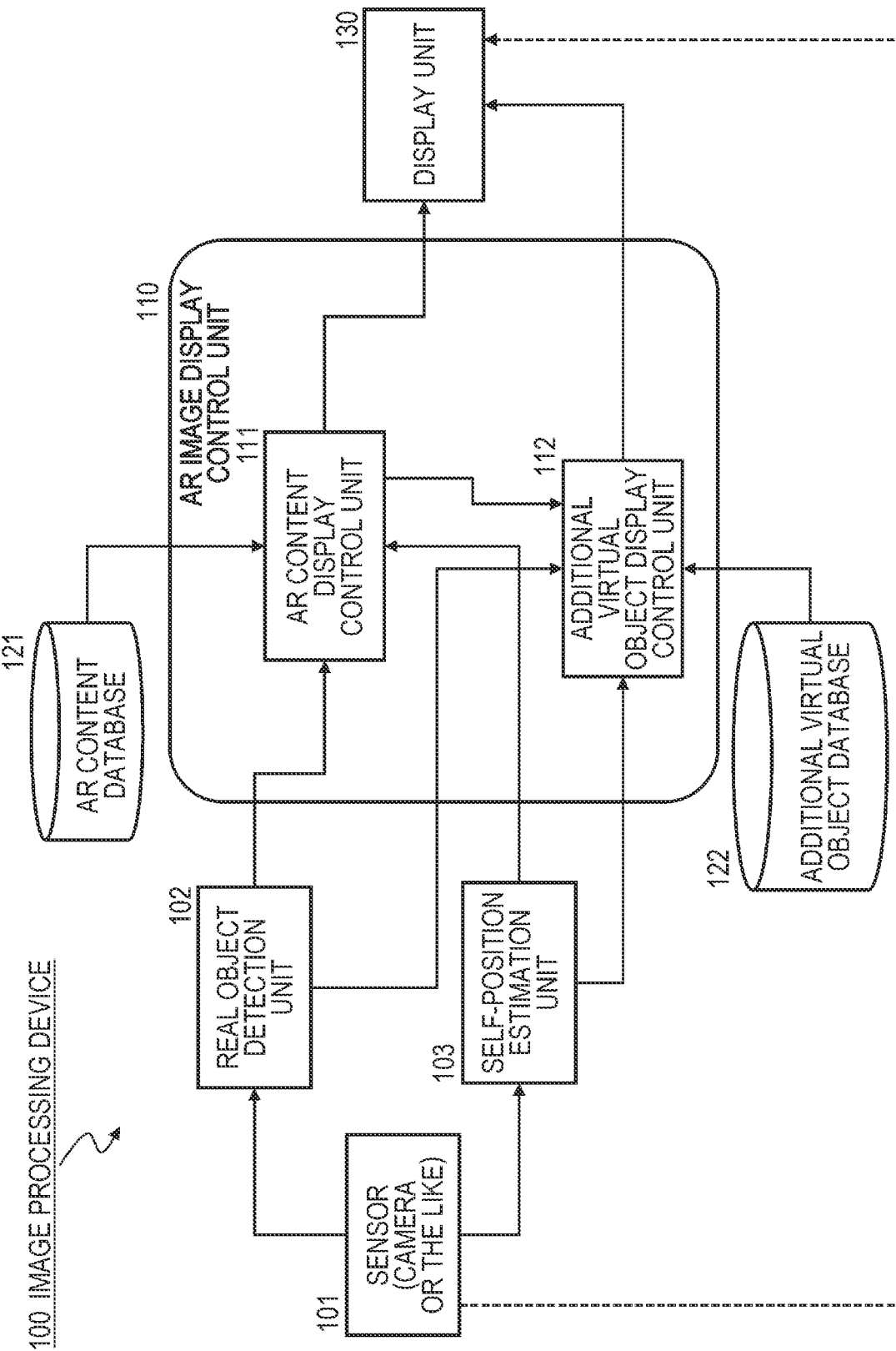
FIG. 5 is a diagram describing a configuration example of the image processing device of the present disclosure.

FIG. 5 is a diagram describing a configuration example of the image processing device 100 of the present disclosure.

The image processing device 100 is, for example, each device described above with reference to FIGS. 1A, 1B and 2. That is, the image processing device 100 includes a light transmission type AR image display device (HMD) 10 illustrated in FIGS. 1A and 1B, a camera-captured image display type AR image display device (HMD) 31 illustrated in FIG. 2, a smartphone, a terminal 33 such as a tablet, a PC 34, and the like.

As illustrated in FIG. 5, the image processing device 100 includes a sensor (camera or the like) 101, a real object detection unit 102, a self-position estimation unit 103, an AR image display control unit 110, an AR content database 121, an additional virtual object database 122, and a display unit 130.

Note that the AR image display control unit 110 includes an AR content display control unit 111 and an additional virtual object display control unit 112.

The sensor (camera or the like) 101 includes a camera that captures an image of the real world where the real object such as a person exists, and a distance sensor (depth sensor) that acquires a distance value from the camera to the real object.

Acquired information (camera-captured image, distance image, and the like) of the sensor (camera or the like) 101 is input to the real object detection unit 102 and the self-position estimation unit 103.

Note that, in a case where the image processing device 100 is the light transmission type (see-through type) AR image display device 10 as illustrated in FIGS. 1A and 1B, the acquired information of the sensor (camera or the like) 101 is, for example, a luminance image and a distance image to be applied to real object detection processing in the real object detection unit 102 and self-position estimation in the self-position estimation unit 103.

The distance image is, for example, an image in which gray level pixel value information corresponding to the distance from the sensor (camera or the like) 101 is recorded.

Furthermore, in a case where the image processing device 100 is configured to display a camera-captured image on the display unit, such as the camera-captured type AR image display device 31 or the smartphone 32 as illustrated in FIG. 2, the acquired information of the sensor (camera or the like) 101 is, for example, a camera captured RGB image and a distance image to be displayed on the display unit. The real object detection processing in the real object detection unit 102 and the self-position estimation in the self-position estimation unit 103 are executed by applying the camera captured RGB image and the distance image.

The real object detection unit 102 analyzes the acquired information (luminance image, distance image, or the like) of the sensor (camera or the like) 101, and analyzes the type (human, plant, or the like) of the real object in the captured image of the sensor (camera) and the position of each real object. Note that the position of the real object to be analyzed includes the position in the image plane and the distance from the sensor (camera or the like) 101, which is the position in the depth direction.

The type and position information of the real object detected by the real object detection unit 102 are output to the AR content display control unit 111 and the virtual object additional display control unit 112 of the AR image display control unit 110.

The self-position estimation unit 103 inputs acquired information (luminance image, distance image, or the like) of the sensor (camera or the like) 101, and estimates the self-position, specifically, the camera position of the image processing device.

For example, the self-position is estimated by applying an existing technique such as simultaneous localization and mapping (SRAM) processing using a camera-captured image.

Note that SLAM is a process of executing camera position identification (localization) and environmental map creation (mapping) in parallel.

The camera position information of the image processing device 100, which is the analysis result of the self-position estimation unit 103, is output to the AR content display control unit 111 and the virtual object additional display control unit 112 of the AR image display control unit 110.

The AR content display control unit 111 of the AR image display control unit 110 executes display control of the AR content on the display unit 130.

The AR content display control unit 111 displays the virtual object acquired from the AR content database 121 together with the real image including the real object captured by the sensor (camera or the like) 101.

That is, the display processing of the AR content as described above with reference to FIG. 3 is performed.

Note that, in virtual object display processing, the AR content display control unit 111 compares the display position of the virtual object with the position of the real object, and executes, in a case where the real object exists in a region overlapping with the virtual object and the real object is located on the near side (camera side or AR image observation user side) of the virtual object, virtual object display control such that the virtual object in the overlapping region is not displayed.

The additional virtual object display control unit 112 of the AR image display control unit 110 executes the display processing of the additional virtual object described above with reference to FIG. 4.

That is, control is performed to display a new additional virtual object on the near side of the real object so as to hide at least a partial region of the flicker occurrence region at the boundary portion between the real object on the near side (camera side or AR image observation user side) of a content-corresponding virtual object and the content-corresponding virtual object.

Note that the additional virtual object display control unit 112 analyzes the position of the real object detected by the real object detection unit 102 and the self-position estimated by the self-position estimation unit 103, and determines the output position of the additional virtual object.

The additional virtual object display control unit 112 selects and displays a virtual object to be additionally displayed from the additional virtual object database 122.

The additional virtual object database 122 is a database that stores various types of additional virtual objects.

The type of the additional virtual object to be additionally displayed is selected by, for example, the AR image display application that performs display control of AR image content.

Specifically, for example, a virtual object of the same type as the real object displayed in the AR image is selected and displayed.

In the example illustrated in FIG. 4 described above, since the real objects 61 and 62 in the AR image are people, selection processing is performed such that the additional virtual objects 81 and 82 to be additionally displayed are also virtual objects of people.

Note that, as described above, the type of the additional virtual object to be additionally displayed is not limited to the same type as the displayed real object, and is only required to be another object of a non-unnatural type corresponding to the environment of the AR image being displayed.

For example, as illustrated in FIG. 4, in a case where the display environment of the AR image is "park" or "walk", a virtual object that is not unnatural even if it exists in "park" or "walk", for example, a virtual object of a type such as a person, a dog, or a cat is selected and displayed.

Note that, as described above with reference to FIG. 4, in a case where the real object is an object that moves like a person, the boundary region between the real object and the virtual object also moves. In such a case, the additional virtual object display control unit 112 displays the additional virtual object so as to move along with movement of the boundary region. By performing this process, it is possible to effectively hide the flicker portion of the moving boundary region.

The display unit 130 displays the AR image including the real object and the virtual object.

Note that, in a case where the image processing device 100 is the light transmission type (see-through type) AR image display device 10 illustrated in FIGS. 1A and 1B, the real object image observed by the user is an object that is transmitted through the light transmission type (see-through type) AR image display device 10 and directly observed by the user.

On the other hand, in a case where the image processing device 100 is the camera-captured image display type AR image display device 31, the smartphone 32, the tablet terminal 33, the PC 34, or the like illustrated in FIG. 2, the real object image observed by the user is an image captured by the sensor (camera) 101. A dotted line illustrated in FIG. 5 is a dotted line indicating an input-output line of the camera-captured image.

On the display unit 130, a virtual object is displayed together with the real object.

The virtual object displayed on the display unit is the AR content corresponding virtual object acquired by the AR content display control unit 111 from the AR content database 121 and the additional virtual object additionally displayed by control of the additional virtual object display control unit 112.

The AR content corresponding virtual object corresponds to, for example, the virtual object 51 illustrated in FIGS. 3 and 4. That is, the virtual object is a virtual object scheduled to be output as the AR content from the beginning.

On the other hand, the additional virtual object is a virtual object displayed at a position (camera side or AR image observation user side) in front of the real object so as to hide a region including at least a part of a boundary region between the AR content corresponding virtual object and the real object in front thereof.

For example, there are additional virtual objects 81 and 82 illustrated in FIG. 4.

The display image displayed by the display processing is an image as illustrated in FIG. 4 described above.

That is, the AR image in which the new additional virtual object is displayed on the near side of the real object is displayed so as to hide at least a partial region of the boundary portion between the real object on the near side of the virtual object and the virtual object.

By this display processing of the additional virtual object, the flicker at the boundary portion between the real object and the virtual object is covered and is hardly recognized by the user (AR image observer).

[5. Processing Sequence Executed by Image Processing Device of Present Disclosure]

Next, a processing sequence executed by the image processing device of the present disclosure will be described.

Figure 6:
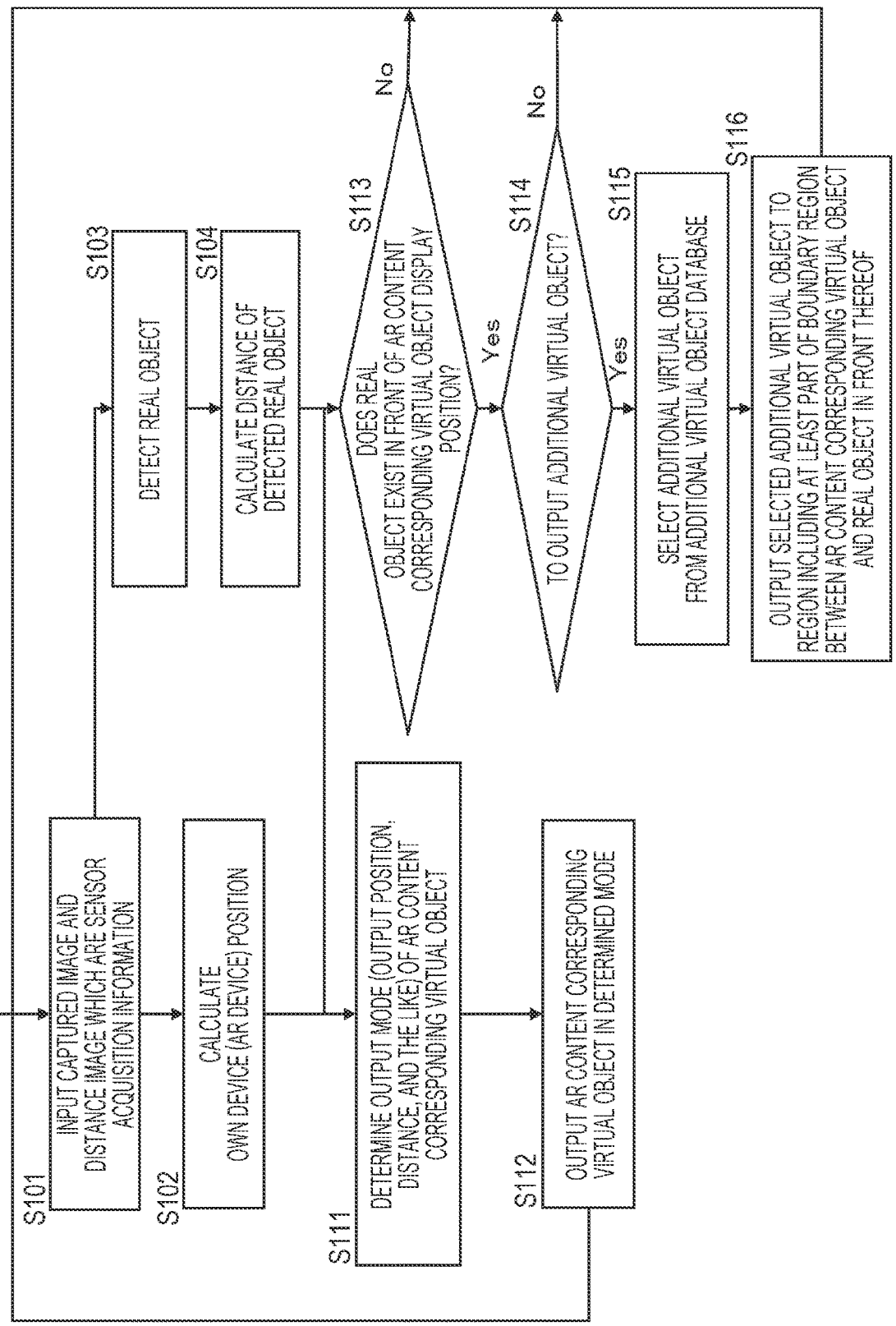
FIG. 6 is a diagram illustrating a flowchart describing a sequence of processing executed by the image processing device of the present disclosure.

FIG. 6 is a diagram illustrating a flowchart describing the processing sequence executed by the image processing device of the present disclosure.

Note that the processing according to the flowchart illustrated in FIG. 6 is processing executed by the image processing device 100 having the configuration illustrated in FIG. 5. The image processing device 100 includes a CPU having a program execution function, and executes processing according to a flow using a program stored in a storage unit, for example, an AR image display application.

Note that the flow of FIG. 6 illustrates processing repeatedly executed as processing in units of image frames captured by the camera constituting the sensor 101 or in units of a plurality of image frames. That is, while the display processing of the AR image on the display unit 130 is being continued, the processing illustrated in the flow of FIG. 6 is repeatedly executed.

Hereinafter, processes of respective steps of the flow illustrated in FIG. 6 will be described.

(Step S101)

First, in step S101, the image processing device 100 inputs a camera-captured image and a distance image.

This processing is input processing of acquired information of the sensor (camera or the like) 101 of the image processing device 100 illustrated in FIG. 5.

As described with reference to FIG. 5, the sensor (camera or the like) 101 includes a camera that captures a real-world image (luminance image or color image) in which a real object such as a person exists, and a distance sensor (depth sensor) that acquires a distance image in which a distance value from the camera to the real object is set as a gray level pixel value.

Acquired information (camera-captured image, distance image, and the like) of the sensor (camera or the like) 101 is input to the real object detection unit 102 and the self-position estimation unit 103.

(Step S102)

Next, in step S102, the image processing device 100 calculates an own device (AR device) position.

This processing is processing executed by the self-position estimation unit 103 of the image processing device 100 illustrated in FIG. 5.

The self-position estimation unit 103 inputs acquired information (camera-captured image, distance image, and the like) of the sensor (camera or the like) 101, and estimates the self-position, specifically, the camera position of the image processing device 100 (position of the sensor (camera or the like) 101).

For example, the self-position is estimated by applying an existing technique such as simultaneous localization and mapping (SRAM) processing using a camera-captured image.

(Steps S103 and S104)

Processes of steps S103 and S104 are executed in parallel with the process of step S102. The image processing device 100 executes processing of detecting a real object and distance calculation processing in steps S103 and S104.

This processing is processing executed by the real object detection unit 102 of the image processing device 100 illustrated in FIG. 5.

The real object detection unit 102 analyzes the acquired information (camera-captured image, distance image, or the like) of the sensor (camera or the like) 101, and analyzes the type (human, plant, or the like) of the real object in the captured image of the sensor (camera) and the position of each real object. Note that the position of the real object to be analyzed includes the position in the image plane and the distance from the sensor (camera or the like) 101, which is the position in the depth direction.

Processes of steps S111 and S112 and processes of steps S113 to S116 are also executed in parallel.

The processes of steps S111 and S112 are processes executed by the AR content display control unit 111 of the image processing device 100 illustrated in FIG. 5.

The processes of steps S113 to S116 are processes executed by the additional virtual object display control unit 112 of the image processing device 100 illustrated in FIG. 5.

(Step S111)

First, the processes of steps S111 and S112 executed by the AR content display control unit 111 of the image processing device 100 illustrated in FIG. 5 will be described.

In step S111, the AR content display control unit 111 of the image processing device 100 illustrated in FIG. 5 determines an output mode (output position, distance, and the like) of the AR content corresponding virtual object.

Note that, here, the AR content corresponding virtual object corresponds to, for example, the virtual object 51 illustrated in FIGS. 3 and 4. That is, the virtual object is a virtual object registered as an output scheduled virtual object in the AR content from the beginning. The virtual objects are not additional virtual objects such as the additional virtual objects 81 and 82 illustrated in FIG. 4.

As described above with reference to FIG. 5, the AR content display control unit 111 displays the virtual object acquired from the AR content database 121 together with the real image including the real object captured by the sensor (camera or the like) 101.

That is, the display processing of the AR content as described above with reference to FIG. 3 is performed.

Note that, in the virtual object display processing, the AR content display control unit 111 compares the display position of the virtual object with the position of the real object, and determines, in a case where the real object exists in a region overlapping with the virtual object and the real object is located on the near side (camera side or AR image observation user side) of the virtual object, virtual object display mode such that the virtual object in the overlapping region is not displayed.

(Step S112)

Next, in step S112, the AR content display control unit 111 of the image processing device 100 outputs the virtual object to the display unit 130 according to the display mode of the virtual object determined in step S111.

(Step S113)

Next, the processes of steps S113 to S116 executed by the additional virtual object display control unit 112 of the image processing device 100 illustrated in FIG. 5 will be described.

In step S113, the additional virtual object display control unit 112 of the image processing device 100 illustrated in FIG. 5 first determines whether or not a real object exists in front of an AR content corresponding virtual object display position.

The display position of the AR content corresponding virtual object is the position determined by the AR content display control unit 111 in step S111, that is, the position including the distance from the camera.

Furthermore, the position of the real object is position information of the real object acquired by the real object detection unit 102 analyzing the acquired information (camera-captured image, distance image, and the like) of the sensor (camera or the like) 101 in step S103, and is information including the position in the image plane and the distance from the camera, which is the position in the depth direction.

The additional virtual object display control unit 112 of the image processing device 100 illustrated in FIG. 5 determines whether or not a real object exists in front of the AR content corresponding virtual object display position in step S113 on the basis of these pieces of information.

In a case where it is determined in step S113 that the real object exists in front of the AR content corresponding virtual object display position (camera side or AR image observation user side), the process proceeds to step S114.

On the other hand, in a case where it is determined in step S113 that the real object does not exist in front of the AR content corresponding virtual object display position, the process returns to step S101 and proceeds to the processing of the next processing frame.

(Step S114)

In a case where it is determined in step S113 that the real object exists in front of the AR content corresponding virtual object display position, the process proceeds to step S114.

In step S114, the additional virtual object display control unit 112 of the image processing device 100 illustrated in FIG. 5 determines whether or not to output the additional virtual object.

Note that this output determination processing is executed according to a predefined output determination rule. Specifically, for example, determination is made according to the following rule.

(Rule example 1) In a case where the additional virtual object has not been output, the additional virtual object is output, and in a case where the additional virtual object has already been output, the additional virtual object is not output.

(Rule example 2) In a case where the additional virtual object has not been output within a prescribed time (for example, within one minute), the additional virtual object is output, and in a case where the additional virtual object has been output within a prescribed time (for example, within one minute), the additional virtual object is not output.

(Rule example 3) In a case where the same additional virtual object as the additional virtual object scheduled to be output this time has not been output within a prescribed time (for example, within one hour), the additional virtual object is output, and in a case where the same additional virtual object as the additional virtual object scheduled to be output this time has been output within a prescribed time (for example, within one hour), the additional virtual object is not output.

In step S114, the additional virtual object display control unit 112 determines whether or not to output the additional virtual object, for example, according to any rule of the rule examples 1 to 3 described above.

In a case where it is determined in step S114 that the additional virtual object is to be output, the process proceeds to step S115.

On the other hand, in a case where it is determined in step S114 that the additional virtual object is not to be output, the process returns to step S101 and proceeds to the processing of the next processing frame.

(Step S115)

In a case where it is determined in step S114 that the additional virtual object is to be output, the process proceeds to step S115.

In step S115, the additional virtual object display control unit 112 of the image processing device 100 illustrated in FIG. 5 selects an additional virtual object from the additional virtual object database 122.

Note that, as described above with reference to FIG. 5, the additional virtual object display control unit 112 selects an object of a non-unnatural type corresponding to the environment of the AR image being displayed on the display unit 130 as the additional virtual object.

For example, as illustrated in FIG. 4, in a case where the display environment of the AR image is "park" or "walk", a virtual object that is not unnatural even if it exists in "park" or "walk", for example, a virtual object of a type such as a person, a dog, or a cat is selected.

(Step S116)

Next, in step S116, the additional virtual object display control unit 112 outputs the additional virtual object selected in step S115 to a region including at least a part of a boundary region between the AR content corresponding virtual object and the real object in front thereof.

Note that, as described above, in a case where the real object is an object that moves like a person, the boundary region between the real object and the virtual object also moves. In such a case, the additional virtual object display control unit 112 displays the additional virtual object so as to move along with movement of the boundary region. By performing this process, it is possible to effectively hide the flicker portion of the moving boundary region.

As a result of these processes, the AR image including the real object and the virtual object is displayed on the display unit 130.

The real object displayed on the display unit 130 is either the real object directly observed by the user or the real object formed by a camera-captured image.

Furthermore, the virtual object displayed on the display unit 130 is the normal AR content corresponding virtual object displayed by the AR content display control unit 111 and a virtual object additionally displayed by control of the additional virtual object display control unit 112.

The display image displayed by the display processing is an image as illustrated in FIG. 4 described above.

That is, the AR image in which the new additional virtual object is displayed on the near side of the real object is displayed so as to hide at least a partial region of the boundary portion between the real object on the near side of the virtual object and the virtual object.

By this display processing of the additional virtual object, the flicker at the boundary portion between the real object and the virtual object is covered and is hardly recognized by the user (AR image observation user).

[6. Embodiment in which Processing of Limiting Real Object to be Output Processing Target of Additional Virtual Object to Moving Real Object is Performed]

Next, an embodiment will be described in which processing of limiting the real object to be an output processing target of the additional virtual object to a moving real object is performed.

In a case where the real object in front of the virtual object is a non-moving object, the boundary between the real object and the virtual object is fixed, and thus occurrence of the flicker is relatively small.

However, in a case where the real object in front of the virtual object is an object that moves like a pedestrian, the boundary between the real object and the virtual object also moves, and thus the flicker of the boundary portion frequently occurs.

The following embodiment is an embodiment in which processing of detecting the moving real object and limiting an output target of the additional virtual object to the moving real object is performed.

Figure 7:
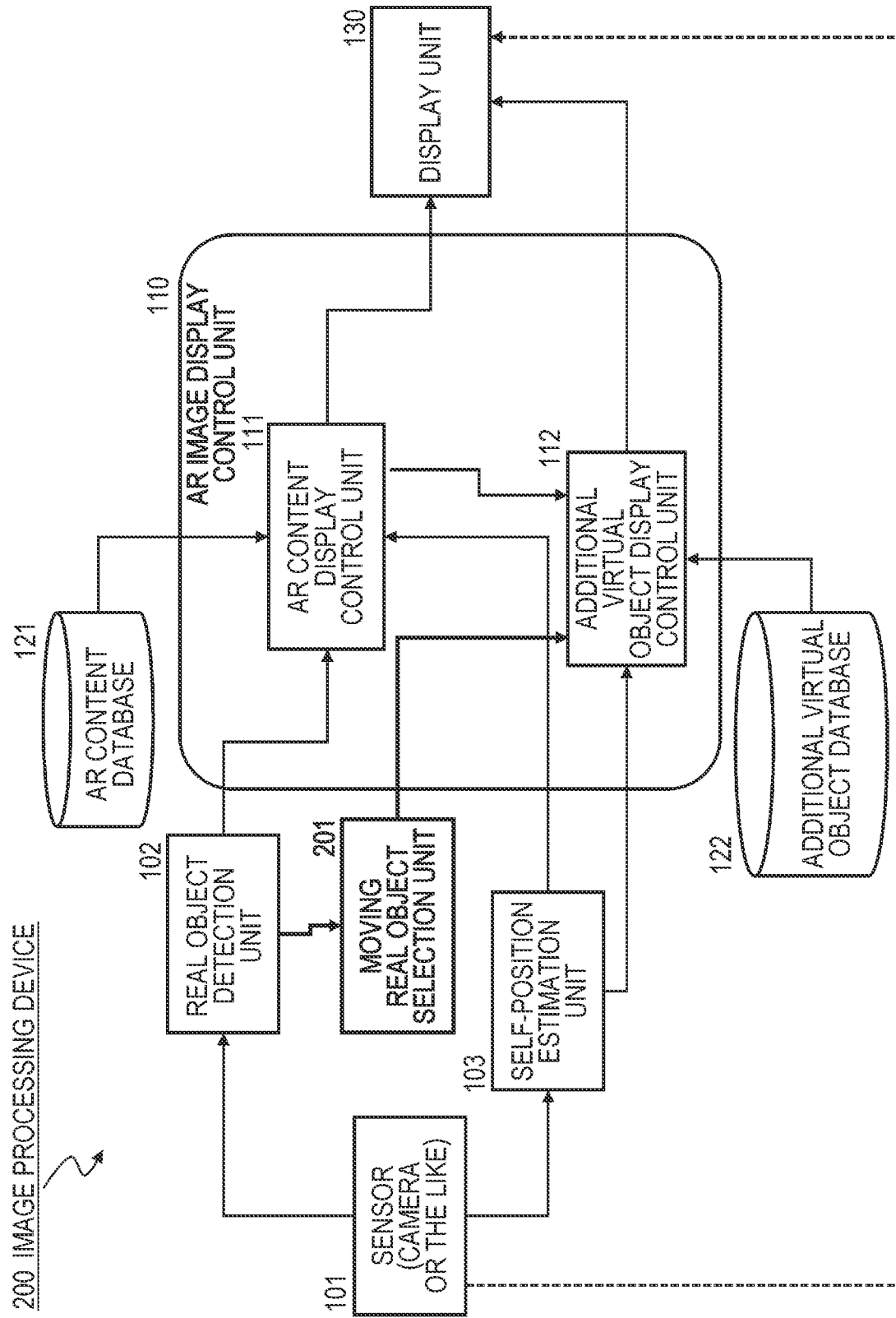
FIG. 7 is a diagram describing a configuration example of the image processing device of the present disclosure.

FIG. 7 illustrates a configuration of an image processing device 200 of the present embodiment.

FIG. 7 is a diagram describing a configuration example of the image processing device 200 of the present embodiment.

The image processing device 200 is, for example, each device described above with reference to FIGS. 1A, 1B and 2. That is, the image processing device 100b includes the light transmission type AR image display device (HMD) 10 illustrated in FIGS. 1A and 1B, the camera-captured image display type AR image display device (HMD) 31 illustrated in FIG. 2, a smartphone, a terminal 33 such as a tablet, a PC 34, and the like.

As illustrated in FIG. 7, the image processing device 200 includes a sensor (camera or the like) 101, a real object detection unit 102, a self-position estimation unit 103, an AR image display control unit 110, an AR content database 121, an additional virtual object database 122, and a display unit 130, and further includes a moving real object selection unit 201.

Note that the AR image display control unit 110 includes an AR content display control unit 111 and an additional virtual object display control unit 112.

A difference between the configuration of the image processing device 200 illustrated in FIG. 7 and the configuration of the image processing device 100 described above with reference to FIG. 5 is that a moving real object selection unit 201 is added to the image processing device 100 illustrated in FIG. 5.

The other configuration is similar to the configuration of the image processing device 100 illustrated in FIG. 5.

The moving real object selection unit 201 executes processing of selecting only the moving real object from the real objects detected by the real object detection unit 102.

As specific processing, for example, a plurality of consecutively captured image frames is compared, and only the moving real object is selected. Specifically, the moving real object such as a person, an automobile, a dog, or a cat is selected.

Further, the type (a person, an automobile, a dog, a cat, or the like) of the selected moving real object and the position of each of the moving real objects are input from the real object detection unit 102 and output to the virtual object additional display control unit 112 of the AR image display control unit 110.

Note that the position of the moving real object includes a position in the image plane and a distance from the camera, which is a position in the depth direction.

The virtual object additional display control unit 112 of the AR image display control unit 110 performs display control of an additional virtual object in which only a moving real object selected by the moving real object selection unit 201 is set as the processing target.

Control is performed to display a new additional virtual object on the near side of the moving real object so as to hide at least a partial region of the flicker occurrence region at the boundary portion between the moving real object in front of the content-corresponding virtual object and the content-corresponding virtual object.

The additional virtual object display control unit 112 selects and displays a virtual object to be additionally displayed from the additional virtual object database 122.

The type of the additional virtual object to be additionally displayed is selected by, for example, the AR image display application that performs display control of AR image content.

Specifically, for example, a virtual object of the same type as the moving real object displayed in the AR image is selected and displayed.

Note that, as described above, the type of the additional virtual object to be additionally displayed is not limited to the same type as the displayed real object, and is only required to be another object of a non-unnatural type corresponding to the environment of the AR image being displayed.

Thus, the image processing device 200 of the present embodiment selects only the boundary region of the moving real object in front of the content-corresponding virtual object as the processing target, and outputs the additional virtual object.

Since the image processing device 200 of the present embodiment does not output the additional virtual object in a boundary region of a still real object having a low occurrence level of the flicker, it is possible to prevent a situation in which a large number of additional virtual objects are displayed.

[7. Processing Sequence Executed by Image Processing Device that Performs Processing of Limiting Real Object to be Output Processing Target of Additional Virtual Object to Moving Real Object]

Next, a processing sequence executed by the image processing device 200 described with reference to FIG. 7, that is, the image processing device 200 that performs processing of limiting the real object to be the output processing target of the additional virtual object to the moving real object will be described.

Figure 8:
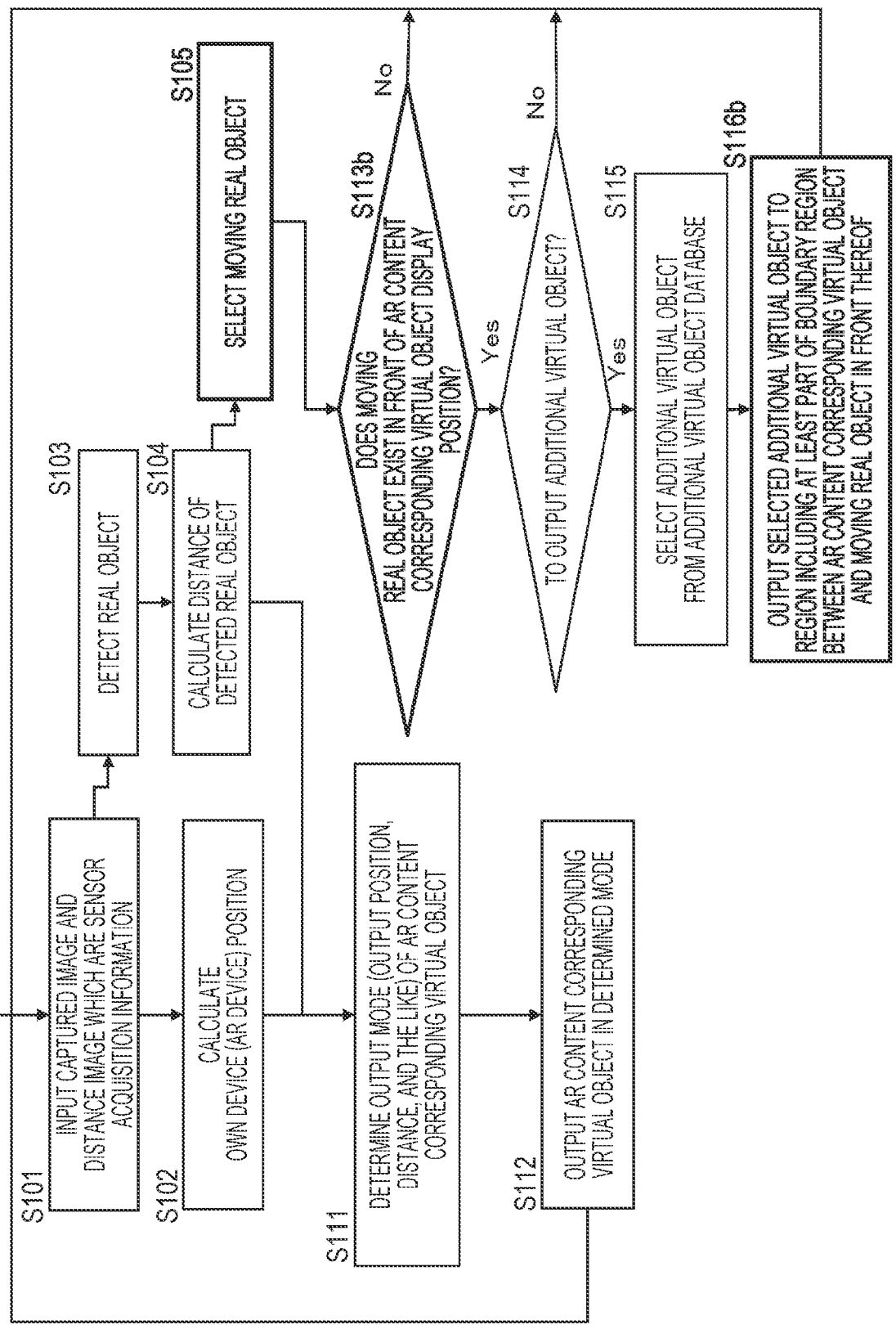
FIG. 8 is a diagram illustrating a flowchart describing a sequence of processing executed by the image processing device of the present disclosure.

FIG. 8 is a diagram illustrating a flowchart describing a processing sequence executed by the image processing device 200 described with reference to FIG. 7.

Note that the processing according to the flowchart illustrated in FIG. 8 is executed according to a program, for example, an AR image display application stored in the storage unit under control of the CPU having a program execution function.

Note that the processing illustrated in a flow of FIG. 8 is processing repeatedly executed as processing in units of image frames captured by the camera constituting the sensor 101 or processing in units of a plurality of image frames. That is, while the display processing of the AR image on the display unit 130 is being continued, the processing according to the flow of FIG. 8 is repeatedly executed.

Processes of steps S101 to S104 and processes of steps S111 and S112 of the flow illustrated in FIG. 8 are similar to the processes of steps S101 to S104 and the processes of steps S111 and S112 of the flow described above with reference to FIG. 6.

Hereinafter, these processes will be briefly described, and processes of step S105 and steps S113b to S116b, which are processes unique to this embodiment, will be described in detail.

(Step S101)

First, in step S101, the image processing device 100 inputs a camera-captured image and a distance image.

This processing is acquired information input processing from the sensor (camera or the like) 101 of the image processing device 200 illustrated in FIG. 7.

Acquired information (camera-captured image, distance image, and the like) of the sensor (camera or the like) 101 is input to the real object detection unit 102 and the self-position estimation unit 103.

(Step S102)

Next, in step S102, the image processing device 100 calculates an own device (AR device) position.

This processing is processing executed by the self-position estimation unit 103 of the image processing device 200 illustrated in FIG. 7. For example, the self-position is estimated by applying an existing technique such as SRAM processing using a camera-captured image.

(Steps S103 and S104)

Processes of steps S103 and S104 are executed in parallel with the process of step S102. The image processing device 200 executes processing of detecting a real object and distance calculation processing in steps S103 and S104.

This processing is processing executed by the real object detection unit 102 of the image processing device 200 illustrated in FIG. 7.

The real object detection unit 102 analyzes the acquired information (camera-captured image, distance image, or the like) of the sensor (camera or the like) 101, and analyzes the type (human, plant, or the like) of the real object in the captured image of the sensor (camera) and the position of each real object. Note that the position of the real object to be analyzed includes the position in the image plane and the distance from the sensor (camera or the like) 101, which is the position in the depth direction.

Processes in subsequent steps S111 and S112 are also executed in parallel with processes of steps S105 to S116b.

The processes of steps S111 and S112 are processes executed by the AR content display control unit 111 of the image processing device 200 illustrated in FIG. 7.

The processes of steps S105 to S116b are processes executed by the moving real object selection unit 201 and the additional virtual object display control unit 112 of the image processing device 200 illustrated in FIG. 7.

(Step S111)

First, the processes of steps S111 and S112 executed by the AR content display control unit 111 of the image processing device 200 illustrated in FIG. 7 will be described.

In step S111, the AR content display control unit 111 of the image processing device 100 illustrated in FIG. 7 determines an output mode (output position, distance, and the like) of the AR content corresponding virtual object. The AR content corresponding virtual object corresponds to, for example, the virtual object 51 illustrated in FIGS. 3 and 4. That is, the virtual object is a virtual object registered as an output scheduled virtual object in the AR content from the beginning. It is not the additional virtual object.

The AR content display control unit 111 displays the virtual object acquired from the AR content database 121 together with the real image including the real object captured by the sensor (camera or the like) 101.

That is, the display processing of the AR content as described above with reference to FIG. 3 is performed.

Note that, in the virtual object display processing, the AR content display control unit 111 compares the display position of the virtual object with the position of the real object, and determines, in a case where the real object exists in a region overlapping with the virtual object and the real object is located on the near side (camera side or AR image observation user side) of the virtual object, virtual object display mode such that the virtual object in the overlapping region is not displayed.

(Step S112)

Next, in step S112, the AR content display control unit 111 of the image processing device 200 outputs the virtual object to the display unit 130 according to the display mode of the virtual object determined in step S111.

(Step S105)

Next, the processes of steps S105 to S116b executed by the moving real object selection unit 201 and the additional virtual object display control unit 112 of the image processing device 200 illustrated in FIG. 7 will be described.

The moving real object selection unit 201 of the image processing device 200 illustrated in FIG. 7 executes the following processing in step S105.

In step S105, the real object selection unit 201 executes processing of selecting only the moving real object from the real objects detected by the real object detection unit 102 in steps S103 to S104.

As specific processing, as described above, for example, a plurality of consecutive captured image frames is compared, and only the moving real object is selected. Specifically, the moving real object such as a person, an automobile, a dog, or a cat is selected.

The real object selection unit 201 inputs the type (a person, an automobile, a dog, a cat, and the like) of the selected moving real object and the position of each of the moving real objects from the real object detection unit 102 and outputs them to the virtual object additional display control unit 112 of the AR image display control unit 110.

(Step S113b)

Next, the processes of steps S113b to S116b executed by the additional virtual object display control unit 112 of the image processing device 200 illustrated in FIG. 7 will be described.

First, in step S113b, the additional virtual object display control unit 112 of the image processing device 200 illustrated in FIG. 7 determines whether or not the moving real object exists in front of the AR content corresponding virtual object display position.

The display position of the AR content corresponding virtual object is the position determined by the AR content display control unit 111 in step S111, that is, the position including the distance from the camera.

Furthermore, the position of the moving real object is position information of the moving real object acquired by analyzing the acquired information (image, distance data, or the like) of the sensor (camera or the like) 101 by the real object detection unit 102 and the moving real object selection unit 201 in steps S103 to S105, and is information including the position in the image plane and the distance from the camera, which is the position in the depth direction.

The additional virtual object display control unit 112 of the image processing device 200 illustrated in FIG. 7 determines whether or not the moving real object such as a person exists in front of the AR content corresponding virtual object display position in step S113 on the basis of these pieces of information.

In a case where it is determined in step S113 that the moving real object exists in front of the AR content corresponding virtual object display position, the process proceeds to step S114.

On the other hand, in a case where it is determined in step S113 that the moving real object does not exist in front of the AR content corresponding virtual object display position, the process returns to step S101 and proceeds to the processing of the next processing frame.

(Step S114)

In a case where it is determined in step S113b that the moving real object exists in front of the AR content corresponding virtual object display position, the process proceeds to step S114.

In step S114, the additional virtual object display control unit 112 of the image processing device 200 illustrated in FIG. 7 determines whether or not to output the additional virtual object.

Note that this output determination processing is executed according to a predefined output determination rule. Specifically, the determination is made according to the rule described above in step S114 of the flow of FIG. 6.

In a case where it is determined in step S114 that the additional virtual object is to be output, the process proceeds to step S115.

On the other hand, in a case where it is determined in step S114 that the additional virtual object is not to be output, the process returns to step S101 and proceeds to the processing of the next processing frame.

(Step S115)

In a case where it is determined in step S114 that the additional virtual object is to be output, the process proceeds to step S115.

In step S115, the additional virtual object display control unit 112 of the image processing device 200 illustrated in FIG. 7 selects an additional virtual object from the additional virtual object database 122.

Note that the additional virtual object display control unit 112 selects an object of a non-unnatural type corresponding to the environment of the AR image being displayed on the display unit 130 as the additional virtual object.

For example, as illustrated in FIG. 4, in a case where the display environment of the AR image is "park" or "walk", a virtual object that is not unnatural even if it exists in "park" or "walk", for example, a virtual object of a type such as a person, a dog, or a cat is selected.

(Step S116b)

Next, in step S116b, the additional virtual object display control unit 112 outputs the additional virtual object selected in step S115 to a region including at least a part of a boundary region between the AR content corresponding virtual object and the moving real object in front thereof.

Note that since the moving real object is a moving object, the boundary region between the moving real object and the virtual object also moves. The additional virtual object display control unit 112 displays the additional virtual object so as to move along with movement of the boundary region. By performing this process, it is possible to effectively hide the flicker portion of the moving boundary region.

As a result of these processes, the AR image including the real object and the virtual object is displayed on the display unit 130.

The real object displayed on the display unit 130 is either the real object directly observed by the user or the real object formed by a camera-captured image.

Furthermore, the virtual object displayed on the display unit 130 is the normal AR content corresponding virtual object displayed by the AR content display control unit 111 and a virtual object additionally displayed by control of the additional virtual object display control unit 112.

The display image displayed by the display processing is an image as illustrated in FIG. 4 described above.

That is, the AR image in which the new additional virtual object is displayed on the near side of the moving real object is displayed so as to hide at least a partial region of the boundary portion between the moving real object like a person on the near side of the virtual object and the virtual object.

By this display processing of the additional virtual object, the flicker at the boundary portion between the moving real object and the virtual object is covered and is hardly recognized by the user (AR image observer).

[8. Other Configuration and Processes of Image Processing Device of Present Disclosure]

Next, configurations and processes of the above-described image processing device of the present disclosure will be described.

In the above-described embodiment, it has been described that the type of the additional virtual object to be additionally displayed by control of the additional virtual object display control unit 112 is an object that matches the real object or an object of a non-unnatural type corresponding to the environment of the AR image being displayed.

A specific example of an object of a non-unnatural type corresponding to the environment of the AR image being displayed will be described.

Hereinafter, (a) an example of an environment of the AR image being displayed and (b) a plurality of combination examples of the additional virtual objects corresponding to this environment will be described.

(1a) Environment of AR image being displayed=outdoor (1b) Examples of additional virtual objects=car, bird, drone, defoliation, balloon, firework, flame, parachute, bubble, dandelion, rain, snow, fog, and the like.

(2a) Environment of AR image being displayed=theme park (2b) Examples of additional virtual objects=character costume, character, ghost, rock, water falling from manhole, characters falling, and the like.

(3a) Environment of AR image being displayed=ranch (3b) Examples of additional virtual objects=cows, horses, sheep, goats, dogs, and the like.

(4a) Environment of AR image being displayed=aquarium (4b) Examples of additional virtual objects=fish, shark, dolphin, whale, penguin, and the like.

(5a) Environment of AR image being displayed=indoor (5b) Examples of additional virtual objects=desk, chair, door, vending machine, and the like.

(6a) Environment of AR image being displayed=environment with people (6b) Examples of additional virtual objects=helmet, prevention, helmet, clothes, and the like worn by a person, (7a) Environment of AR image being displayed=All (7b) Examples of additional virtual objects=camera flash, lightning strike, darkness indicating blackout, and the like.

For example, as described above, (a) an example of an environment of the AR image being displayed, and (b) a combination of additional virtual objects corresponding to this environment are examples of the object of the non-unnatural type corresponding to the environment of the AR image being displayed.

Furthermore, in the above-described embodiments, it has been described that the additional virtual object display control unit 112 performs processing of selectively acquiring a virtual object stored in the additional virtual object database 122 and outputting the virtual object to the display unit 130.

In addition to such processing of acquiring and displaying the virtual object prepared in advance, for example, a configuration to perform processing as follows may be employed.

A configuration may be employed in which the additional virtual object display control unit 112 acquires (captures) an image of a real object detected from the AR image being displayed, generates a virtual object image on the basis of the acquired image, and outputs the generated virtual object as the additional virtual object to the display unit 130.

That is, a configuration may be employed in which the additional virtual object display control unit 112 generates a virtual object based on a real object, and outputs the generated virtual object as the additional virtual object to the display unit.

Alternatively, a configuration may be employed in which the additional virtual object display control unit 112 generates an animation image including a virtual object based on a real object, and outputs the generated animation image as the additional virtual object to the display unit.

In a case where these processes are performed, the additional virtual object database 122 illustrated in FIGS. 5 and 7 is unnecessary.

[9. Hardware Configuration Example of Image Processing Device]

Next, a hardware configuration example of the image processing device that executes the processing according to the above-described embodiment will be described with reference to FIG. 9.

The hardware illustrated in FIG. 9 is an example of a hardware configuration of the image processing device of the present disclosure described with reference to FIGS. 5 and 7.

The hardware configuration illustrated in FIG. 9 will be described.

A central processing unit (CPU) 301 functions as a data processing unit that executes various processes according to a program stored in a read only memory (ROM) 302 or a storage unit 308. For example, processes according to the sequence described in the above-described embodiment are executed. A random access memory (RAM) 303 stores programs, data, and the like to be executed by the CPU 301. The CPU 301, the ROM 302, and the RAM 303 are connected to each other by a bus 304.

The CPU 301 is connected to an input-output interface 305 via the bus 304, and an input unit 306 including various sensors, a camera, a switch, a keyboard, a mouse, a microphone, and the like, and an output unit 307 including a display, a speaker, and the like are connected to the input-output interface 305.

The storage unit 308 connected to the input-output interface 305 includes, for example, a hard disk and the like and stores programs executed by the CPU 301 and various data. A communication unit 309 functions as a data communication transmitting-receiving unit via a network such as the Internet or a local area network, and communicates with an external device.

A drive 310 connected to the input-output interface 305 drives a removable medium 311 such as a magnetic disk, an optical disk, a magneto-optical disk, or a semiconductor memory such as a memory card, and executes recording or reading of data.

[10. Summary of Configuration of the Present Disclosure]

As described above, the embodiment of the present disclosure has been described in detail with reference to a particular embodiment. However, it is obvious that those skilled in the art can make modifications and substitutions of the embodiment without departing from the gist of the present disclosure. In other words, the present invention has been disclosed in the form of exemplification, and should not be interpreted in a limited manner. In order to determine the gist of the present disclosure, the claims should be taken into consideration.

Note that the technology disclosed in the present description can take the following configurations.

(1) An image processing device including:

a real object detection unit that executes processing of detecting a real object in a real world; and an augmented reality (AR) image display control unit that generates an AR image visually recognized in such a manner that a virtual object exists in a same space as a real object and outputs the AR image to a display unit, in which the AR image display control unit, in a case where a position of the real object detected by the real object detection unit is on a near side in a depth direction with respect to a position where the virtual object to be displayed on the display unit is arranged, outputs an additional virtual object to the display unit on the near side in the depth direction with respect to the position of the real object in such a manner as to hide at least a partial region of a boundary region between the virtual object and the real object.

(2) The image processing device according to (1), in which the AR image display control unit outputs an additional virtual object of a type corresponding to a display environment of the AR image being displayed on the display unit to the display unit.

(3) The image processing device according to (1) or (2), in which the AR image display control unit outputs an additional virtual object of a type corresponding to a type of the real object at a near side position of the virtual object to the display unit.

(4) The image processing device according to (3), in which the AR image display control unit outputs an additional virtual object of a same type as the real object at a near side position of the virtual object to the display unit.

(5) The image processing device according to any one of (1) to (4), in which the AR image display control unit outputs an additional virtual object of a type selected by an AR image display application to the display unit.

(6) The image processing device according to any one of (1) to (5), in which the AR image display control unit, in a case where the real object at a near side position of the virtual object is a moving real object, outputs the additional virtual object to the display unit.

(7) The image processing device according to any one of (1) to (6), in which the AR image display control unit moves and displays, in a case where the real object at a near side position of the virtual object is a moving real object, the additional virtual object along with movement of a boundary region between the virtual object and the real object.

(8) The image processing device according to any one of (1) to (7), further including:

a self-position estimation unit that estimates a position of the own device, in which the AR image display control unit analyzes a position of a real object detected by the real object detection unit and a self-position estimated by the self-position estimation unit, and determines an output position of the additional virtual object.

(9) The image processing device according to any one of (1) to (8), further including:

an additional virtual object database storing various types of additional virtual objects, in which the AR image display control unit outputs an additional virtual object acquired from the additional virtual object database to the display unit.

(10) The image processing device according to any one of (1) to (9), in which the display unit is a transmission display unit, and the transmission display unit is a display unit that enables observation together of a real object that is directly observable by a user via the transmission display unit, and a virtual object output by control of the AR image display control unit.

(11) The image processing device according to any one of (1) to (9), in which the display unit is a non-transmission display unit, and the non-transmission display unit is a display unit that displays together a real object formed by a camera-captured image and a virtual object output by control of the AR image display control unit.

(12) The image processing device according to any one of (1) to (11), in which the AR image display control unit includes an AR content display control unit that outputs, to the display unit, an AR content corresponding virtual object that is originally scheduled to be output as AR content, and an additional virtual object display control unit that outputs, to the display unit, the additional virtual object that is not an AR content corresponding virtual object that is originally scheduled to be output as the AR content.

(13) The image processing device according to any one of (1) to (12), in which the AR image display control unit generates a virtual object based on the real object, and outputs the generated virtual object to the display unit as the additional virtual object.

(14) The image processing device according to any one of (1) to (13), in which the AR image display control unit generates an animation image including a virtual object based on the real object, and outputs the generated animation image as the additional virtual object to the display unit.

(15) An image processing method executed in an image processing device, the method including:

an actual object detecting step, by a real object detection unit, of executing processing of detecting a real object in a real world; and an augmented reality (AR) image display controlling step, by an AR image display control unit, of generating an AR image visually recognized in such a manner that a virtual object exists in a same space as a real object and outputting the AR image to a display unit, in which the AR image display controlling step includes, in a case where a position of the real object detected by the real object detection unit is on a near side in a depth direction with respect to a position where the virtual object to be displayed on the display unit is arranged, a step of outputting an additional virtual object to the display unit on the near side in the depth direction with respect to the position of the real object in such a manner as to hide at least a partial region of a boundary region between the virtual object and the real object.

(16) A program for causing an image processing device to execute image processing, the program causing execution of:

an actual object detecting step, by a real object detection unit, of executing processing of detecting a real object in a real world; and an augmented reality (AR) image display controlling step, by an AR image display control unit, of generating an AR image visually recognized in such a manner that a virtual object exists in a same space as a real object and outputting the AR image to a display unit, in which the AR image display controlling step includes, in a case where a position of the real object detected by the real object detection unit is on a near side in a depth direction with respect to a position where the virtual object to be displayed on the display unit is arranged, executing outputting an additional virtual object to the display unit on the near side in the depth direction with respect to the position of the real object in such a manner as to hide at least a partial region of a boundary region between the virtual object and the real object.

Furthermore, a series of processes described in the description can be executed by hardware, software, or a combined configuration of the both. In a case of executing processes by software, a program recording a processing sequence can be installed and run on a memory in a computer incorporated in dedicated hardware, or the program can be installed and run on a general-purpose computer capable of executing various processes. For example, the program can be recorded in advance on a recording medium. In addition to being installed on a computer from a recording medium, the program can be received via a network such as a local area network (LAN) or the Internet and installed on a recording medium such as an internal hard disk.

Note that the various processes described in the description are not only executed in time series according to the description, but may be executed in parallel or individually according to processing capability of the device that executes the processes or as necessary. Furthermore, a system in the present description is a logical set configuration of a plurality of devices, and is not limited to one in which devices with respective configurations are in the same housing.

INDUSTRIAL APPLICABILITY

As described above, according to a configuration of an embodiment of the present disclosure, a device and a method for performing AR image display control in which flicker in a boundary region between a virtual object and a real object is not noticeable are achieved.

Specifically, for example, a real object detection unit that executes processing of detecting a real object in a real world, and an augmented reality (AR) image display control unit that generates an AR image visually recognized in such a manner that a virtual object exists in a same space as a real object and outputs the AR image to a display unit are included, in which the AR image display control unit, in a case where a position of the real object detected by the real object detection unit is on a near side in a depth direction with respect to a position where the virtual object to be displayed on the display unit is arranged, an additional virtual object is output to the display unit on the near side in the depth direction with respect to the position of the real object in such a manner as to hide at least a partial region of a boundary region between the virtual object and the real object.

With this configuration, a device and a method for performing AR image display control in which flicker in a boundary region between a virtual object and a real object is not noticeable are achieved.

REFERENCE SIGNS LIST

10 Light transmission type AR image display device
21 Transmission observation image
22 Virtual object image
31 Camera-captured image display type AR image display device
32 Smartphone
33 Tablet terminal
34 PC
51 Virtual object
61, 62 Real object
71 Boundary portion flicker
81, 82 Additional virtual object
100 Image processing device
101 Sensor (camera or the like)
102 Real object detection unit
103 Self-position estimation unit
110 AR image display control unit
111 AR content display control unit
112 Additional virtual object display control unit
121 AR content database
122 Additional virtual object database
130 Display unit
201 Moving real object selection unit
301 CPU
302 ROM
303 RAM
304 Bus
305 Input-output interface
306 Input unit
307 Output unit
308 Storage unit
309 Communication unit
310 Drive
311 Removable medium

The invention claimed is:

1. An image processing device, comprising:
a central processing unit (CPU) configured to:
detect a real object in a real world;
generate an AR image visually recognized in such a manner that a virtual object exists in a same space as a real object and output the AR image to a display screen; and
in a case where a position of the real object detected by the real object detection unit is on a near side in a depth direction with respect to a position where the virtual object to be displayed on the display screen is arranged, output an additional virtual object to the display screen on the near side in the depth direction with respect to the position of the real object to hide at least a partial region of a boundary region between the virtual object and the real object.

2. The image processing device according to claim 1, wherein the CPU is further configured to output an additional virtual object of a type corresponding to a display environment of the AR image being displayed on the display screen to the display screen.

3. The image processing device according to claim 1, wherein the CPU is further configured to output an additional virtual object of a type corresponding to a type of the real object at a near side position of the virtual object to the display screen.

4. The image processing device according to claim 3, wherein the CPU is further configured to an additional virtual object of a same type as the real object at a near side position of the virtual object to the display screen.

5. The image processing device according to claim 1, wherein the CPU is further configured to an additional virtual object of a type selected by an AR image display application to the display screen.

6. The image processing device according to claim 1, wherein in a case where the real object at a near side position of the virtual object is a moving real object, the CPU is further configured to output the additional virtual object to the display screen.

7. The image processing device according to claim 1, wherein the CPU is further configured to move and display, in a case where the real object at a near side position of the virtual object is a moving real object, the additional virtual object along with movement of a boundary region between the virtual object and the real object.

8. The image processing device according to claim 1, wherein the CPU is further configured to:
estimate a position of the own device;
analyze a position of a real object detected by the real object detection unit and a self-position estimated by the self-position estimation unit; and
determine an output position of the additional virtual object.

9. The image processing device according to claim 1, further comprising:
an additional virtual object database configured to store, wherein the CPU is further configured to output an additional virtual object acquired from the additional virtual object database to the display screen.

10. The image processing device according to claim 1, wherein
the display screen is a transmission display unit, and
the transmission display unit is a display unit that enables observation together of a real object that is directly observable by a user via the transmission display unit, and a virtual object.

11. The image processing device according to claim 1, wherein
the display screen is a non-transmission display unit, and
the non-transmission display unit is a display unit that displays together a real object formed by a camera-captured image and a virtual object.

12. The image processing device according to claim 1, wherein the CPU is further configured to:

output, to the display screen, an AR content corresponding virtual object that is originally scheduled to be output as AR content; and output, to the display screen, the additional virtual object that is not an AR content corresponding virtual object that is originally scheduled to be output as the AR content.

13. The image processing device according to claim 1, wherein the CPU is further configured to:

generate a virtual object based on the real object; and output the generated virtual object to the display screen as the additional virtual object.

14. The image processing device according to claim 1, wherein the CPU is further configured to:

generate an animation image including a virtual object based on the real object; and output the generated animation image as the additional virtual object to the display screen.

15. An image processing method, comprising:

in an image processing device:

detecting a real object in a real world;

generating an AR image visually recognized in such a manner that a virtual object exists in a same space as a real object and outputting the AR image to a display unit;

in a case where a position of the real object detected by the real object detection unit is on a near side in a depth direction with respect to a position where the virtual object to be displayed on the display unit is arranged, a stop of outputting an additional virtual object to the display unit on the near side in the depth direction with respect to the position of the real object to hide at least a partial region of a boundary region between the virtual object and the real object.

16. A non-transitory computer-readable medium having stored thereon, computer-executable instructions which, when executed by a computer, cause the computer to execute operations, the operations comprising:

an actual object detecting step, by a real object detection unit, of executing processing of detecting a real object in a real world; and an augmented reality (AR) image display controlling step, by an AR image display control unit, of generating an AR image visually recognized in such a manner that a virtual object exists in a same space as a real object and outputting the AR image to a display unit, wherein the AR image display controlling step includes, in a case where a position of the real object detected by the real object detection unit is on a near side in a depth direction with respect to a position where the virtual object to be displayed on the display unit is arranged, executing outputting an additional virtual object to the display unit on the near side in the depth direction with respect to the position of the real object in such a manner as to hide at least a partial region of a boundary region between the virtual object and the real object.

* * * * *